(12) United States Patent
Takaishi

(10) Patent No.: US 7,505,107 B2
(45) Date of Patent: Mar. 17, 2009

(54) DISPLAY DEVICE HAVING PARTICULAR DRIVING CIRCUIT CONNECTION STRUCTURE

(75) Inventor: Masakatsu Takaishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 450 days.

(21) Appl. No.: 11/099,599

(22) Filed: Apr. 6, 2005

(65) Prior Publication Data

US 2005/0237467 A1 Oct. 27, 2005

(30) Foreign Application Priority Data

Apr. 23, 2004 (JP) .............................. 2004-128727
Jan. 17, 2005 (JP) .............................. 2005-008930

(51) Int. Cl.
*G02F 1/1345* (2006.01)
*G02F 1/1333* (2006.01)

(52) U.S. Cl. ...................... 349/149; 349/152; 349/158

(58) Field of Classification Search .................. 349/33, 349/56, 149–152, 158; 361/789; 174/254
See application file for complete search history.

(56) References Cited

U.S. PATENT DOCUMENTS

| | | | | |
|---|---|---|---|---|
| 3,749,959 A | * | 7/1973 | Schmersal et al. .......... | 313/583 |
| 4,806,922 A | * | 2/1989 | McLaughlin et al. .......... | 349/73 |
| 5,612,804 A | * | 3/1997 | Hara ........................... | 349/149 |
| 6,104,464 A | | 8/2000 | Adachi et al. ................ | 349/150 |
| 6,128,063 A | * | 10/2000 | Uchiyama et al. ........... | 349/150 |
| 6,384,890 B1 | * | 5/2002 | Takiar et al. ................. | 349/150 |
| 6,525,718 B1 | * | 2/2003 | Murakami et al. .......... | 345/206 |
| 6,710,838 B2 | * | 3/2004 | Sakaki et al. ................ | 349/149 |
| 7,342,178 B2 | * | 3/2008 | Yang et al. .................. | 174/254 |
| 2002/0173178 A1 | * | 11/2002 | Matsunaga ................... | 439/67 |
| 2005/0040504 A1 | * | 2/2005 | Kang et al. ................. | 257/678 |

FOREIGN PATENT DOCUMENTS

| | | |
|---|---|---|
| JP | 3-168618 | 7/1991 |
| JP | 7-36053 | 2/1995 |
| JP | 8-186336 | 7/1996 |
| JP | 9-80406 | 3/1997 |
| JP | 10-339866 | 12/1998 |
| JP | 2000-312070 | 11/2000 |
| JP | 2003-66474 | 3/2003 |
| JP | 2003-280548 | 10/2003 |

* cited by examiner

*Primary Examiner*—Mike Qi
(74) *Attorney, Agent, or Firm*—Nixon & Vanderhye P.C.

(57) ABSTRACT

A display device comprises a display panel including: a display substrate; an IC mounting substrate which is arranged along the side edge of the display substrate and provided with a display driving IC mounted thereon by face-down bonding; and a substrate connecting part which connects the display substrate and the IC mounting substrate. The substrate connecting part connected to the display substrate has a smaller length than the IC mounting substrate in the direction of extension of the side edge of the display substrate.

15 Claims, 11 Drawing Sheets

DISPLAY DEVICE HAVING PARTICULAR DRIVING CIRCUIT CONNECTION STRUCTURE

CROSS-REFERENCE TO RELATED APPLICATIONS

This non-provisional application claims priority under 35 U.S.C. §119(a) on Japanese Patent Applications Nos. 2004-128727 filed on Apr. 23, 2004 and 2005-8930 filed on Jan. 17, 2005, the entire contents of which are hereby incorporated by reference.

BACKGROUND OF THE INVENTION (a) Field of the Invention

The present invention relates to a display device which comprises a display panel including a display substrate, an IC mounting substrate which is arranged along the side edge of the display substrate and provided with a display driving IC mounted thereon by face-down bonding and a substrate connecting part for connecting these substrates.

(b) Description of Related Art

Various techniques have been developed for the purpose of downsizing, weight reduction and sliming down of liquid crystal displays, e.g., a face-down bonding technique for mounting liquid crystal driving ICs on a glass substrate of a liquid crystal display panel. There have also been developed techniques for solving a wide variety of problems that occur in connection with these techniques related to the liquid crystal displays.

According to Japanese Unexamined Patent Publication No. 2003-280548, a substrate of a display device is thinned while only a single edge thereof is kept thick. Specifically, a glass substrate is thinned down to 0.3 mm in thickness by mechanical polishing while a single edge thereof is kept thick. Then, the substrate is further thinned down to 0.05 mm in thickness by chemical polishing and a substrate reinforcement layer such as a polarizer or the like is arranged at the thinned part. According to this technique, a flexible display device is obtained. External connection terminals are arranged at the thick edge, thereby preventing poor connection from occurring.

Japanese Unexamined Patent Publication No. H9-80406 discloses a liquid crystal display. In the liquid crystal display, the right edge of a lower film substrate protrudes from the right edge of an upper film substrate to form a protrusion and a plurality of connection terminals are arranged on the top surface of the protrusion. Further, cutout portions are formed at both sides of the protrusion so that they are opposed to each other via a bunch of the connection terminals. With this configuration, if a downward bending stress is applied to the protrusion, the protrusion is curved to form an arc by the width of the cutout portions, but not bent or cracked like a conventional liquid crystal display. Accordingly, the connection terminals formed on the protrusion are also curved to form an arc by the width of the cutout portions, thereby preventing poor connection such as a break in wiring traces.

Japanese Unexamined Patent Publication No. H8-186336 discloses a drive circuit module comprising a substrate made of an inflexible hard material, a circuit pattern which is formed on the substrate and provided with a plurality of input terminals and output terminals supported on a flexible insulating film and a mounting part for mounting driving LSIs on the circuit pattern. On the surface opposite to the surface formed with the circuit pattern, the substrate is provided with at least one cut such that the substrate can be bent at the cut, whereby the surface formed with the output terminals and the surface formed with the mounting part are faced to different directions. The publication describes that this configuration allows reduction in outer size of the liquid crystal display and avoids misalignment of the output terminals of the drive circuit module to be connected with wiring terminals of a liquid crystal display panel.

Japanese Unexamined Patent Publication No. H7-36053 discloses a technique, in which a liquid crystal display panel and a circuit board are connected via a TAB (tape automated bonding) which includes a number of foil-shaped leads supported on a flexible insulating film and slits formed in the center thereof, the circuit board is shifted rearward from the liquid crystal display panel by bending the TAB at the slits, and then a protective film is formed to cover the slits. Since the TAB is bent at the slits, it is bent at a small radius of curvature. Further, since the foil-shaped leads exposed at the slits are covered with the protective film, the leads are prevented from breaks and short circuits caused by external force or adhesion of conductive foreign objects. Moreover, since the protective film fixes the bending status of the TAB, restitution of the flexible film of the TAB is surely controlled.

Japanese Unexamined Patent Publication No. H3-168618 describes that linear spacers are arranged in a stripe pattern on a substrate made of plastic or the like while the lengthwise direction of the spacers are aligned with the direction of maximum curvature of the substrate. Thus, a curved liquid crystal panel is obtained in which a liquid crystal layer keeps its thickness uniform even if the panel is greatly curved.

Japanese Unexamined Patent Publication No. H10-339866 discloses a rollable liquid crystal display using a plastic substrate in which a liquid crystal display driving section is gathered at one end of a first substrate. According to this configuration, the liquid crystal display is reduced in size, thereby obtaining portability.

Japanese Unexamined Patent Publication No. 2003-66474 discloses that conversion wiring traces are formed on a planarized layer and every electrode terminal is localized at one end of a liquid crystal display panel, thereby making the liquid crystal display panel suitable for one-side mounting. With this configuration, display devices for cellular phones and the like are reduced in size.

Japanese Unexamined Patent Publication No. 2000-312070 discloses that ones of extraction electrode terminals on a liquid crystal display panel and output electrode terminals on a flexible substrate are arranged at a fixed pitch. Depending on the thermal expansion coefficient of the flexible substrate, the other terminals are arranged at such a pitch that becomes large from the middle of the length of the terminal region towards the peripheral ends thereof. According to this configuration, when the flexible substrate is thermocompression-bonded to the terminals of the liquid crystal display panel via an anisotropic conductive film, poor connection caused by elongation of the flexible substrate is drastically reduced.

When a liquid crystal display panel is used for an electronic book or a cylindrical display, or when it is used on a flat surface and external force is applied thereto, bending deformation may be applied to the liquid crystal display panel.

If a liquid crystal driving IC is mounted on a plastic substrate by face-down bonding and bending deformation is applied to the liquid crystal display panel, the liquid crystal driving IC may come off the plastic substrate together with a coating layer formed on the plastic substrate. This is because of low adhesion strength between the coating layer and the plastic substrate.

The liquid crystal driving IC itself is not bendable. Therefore, even if a plastic substrate is used, bending deformation which can be applied to the liquid crystal display panel is limited by the liquid crystal driving IC.

SUMMARY OF THE INVENTION

An object of the present invention is to prevent a display driving IC from breaking and coming off an IC mounting substrate even if bending deformation is applied to a display substrate which is a main part of a display panel.

To achieve the object, a display device of the present invention comprises a display panel including: a display substrate; an IC mounting substrate which is arranged along the side edge of the display substrate and provided with a display driving IC mounted thereon by face-down bonding; and a substrate connecting part which connects the display substrate and the IC mounting substrate, wherein the substrate connecting part connected to the display substrate has a smaller length than the IC mounting substrate in the direction of extension of the side edge of the display substrate.

With the above configuration, the IC mounting substrate is arranged along the side edge of the display substrate and connected to the display substrate via the substrate connecting part having a smaller length than the IC mounting substrate in the direction of extension of the side edge of the display substrate. Therefore, the IC mounting substrate is given with a degree of freedom independently of the display substrate. Even if bending deformation is applied to the display substrate which is a main part of the display panel, the IC mounting substrate is deformed less by the applied bending deformation, and therefore the display driving IC is not greatly affected. Thus, the display driving IC is prevented from breaking and coming off the IC mounting substrate.

According to a first embodiment of the display device of the present invention, the IC mounting substrate is made of a tongue piece which is formed by cutting the display substrate and provided with a cut formed at the proximal end thereof to extend along the side edge of the display substrate and the substrate connecting part is a remaining part of the proximal end of the tongue piece.

In this embodiment, the display substrate, the IC mounting substrate and the substrate connecting part are integrally formed as a single substrate.

According to a second embodiment of the display device of the present invention, the display substrate and the substrate connecting part are separately made of materials having the same linear expansion coefficient and bonded together with a bonding agent.

In this embodiment, the display substrate and the IC mounting substrate are made of different substrates.

The display device of the present invention is not particularly limited by display system. For example, the display device may be a liquid crystal display.

BRIEF DESCRIPTION OF THE DRAWINGS

These and other objects and advantages of the invention may be readily ascertained by referring to the following description and appended drawings in which.

DETAILED DESCRIPTION OF THE INVENTION

[Configuration of Display Device]

Figure 1:
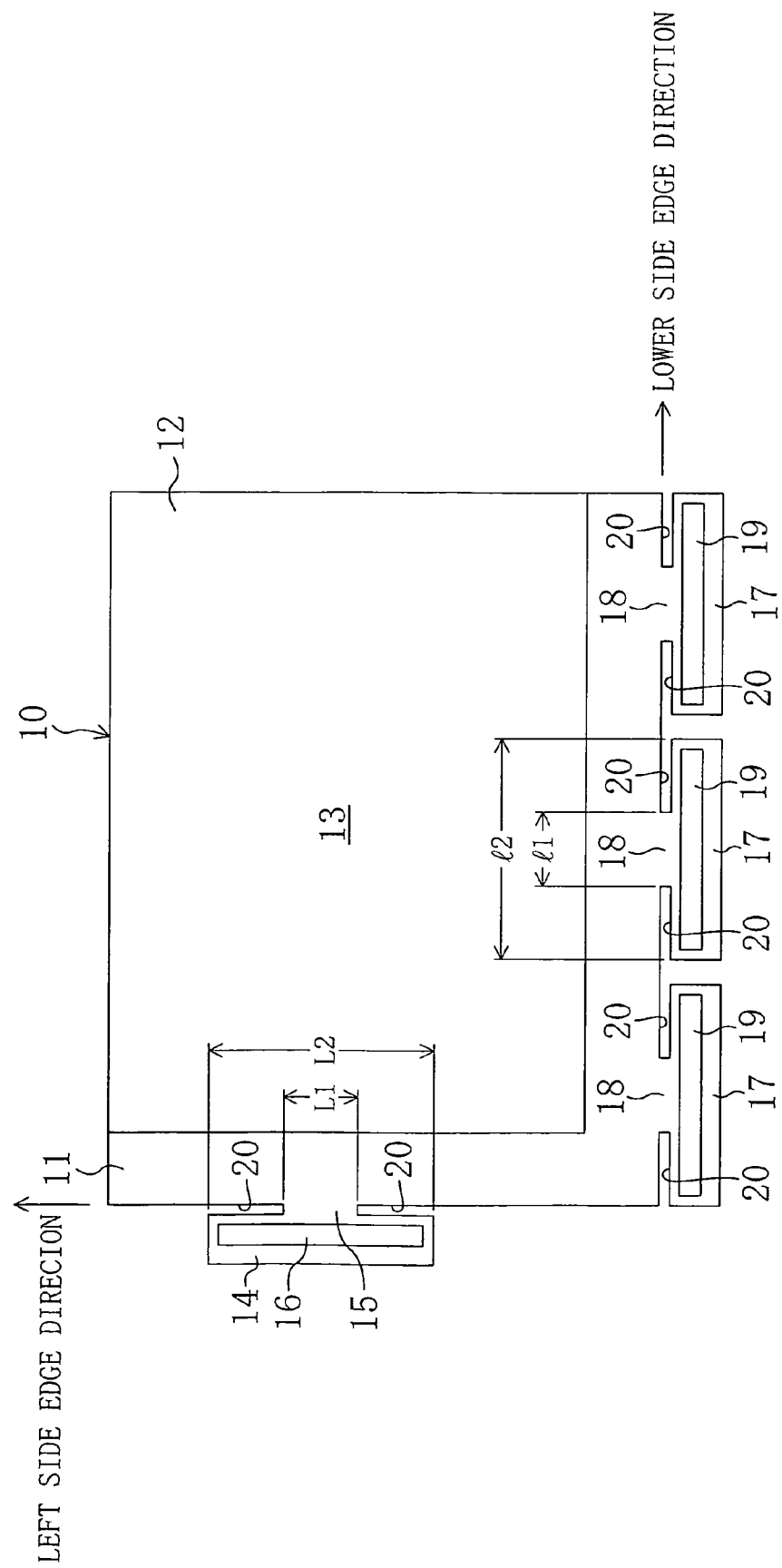
FIG. 1 is a plan view schematically illustrating a liquid crystal display panel of a liquid crystal display according to Embodiment 1.

A display device of the present invention includes a display panel having a display substrate, an IC mounting substrate which is arranged along the side edge of the display substrate and mounted with a display driving IC by face-down bonding; and a substrate connecting part which connects the display substrate and the IC mounting substrate. The substrate connecting part connected to the display substrate has a smaller length than the IC mounting substrate in the direction of the side edge of the display substrate.

With the above configuration, the IC mounting substrate is arranged along the side edge of the display substrate and connected to the display substrate via the substrate connecting part having a smaller length than the IC mounting substrate in the direction of extension of the side edge of the display substrate. Therefore, the IC mounting substrate is given with a degree of freedom independently from the display substrate. Even if bending deformation is applied to the display substrate which is a main part of the display panel, the IC mounting substrate is deformed less by the applied bending deformation, and therefore the display driving IC is not greatly affected. Thus, the display driving IC is prevented from breaking and coming off the IC mounting substrate.

The display device may include a plurality of IC mounting substrates formed along the side edge of the display substrate.

In this case, it is preferable that the display device of the present invention further includes a FPC (flexible printed circuit) which is arranged to connect the plurality of IC mounting substrates formed along the side edge of the display substrate and provided with cuts so that the cuts separate the FPC into parts connected to the IC mounting substrates, respectively.

If the plurality of IC mounting substrates are connected via the FPC, each of the substrates decreases in degree of freedom. However, since the cuts are formed in the FPC so that the cuts separate the FPC into parts connected to the IC mounting substrates, respectively, the degree of freedom of the IC mounting substrates will not be greatly reduced.

The display device is not particularly limited by display system. For example, the display device may be a liquid crystal display or an organic EL display.

Hereinafter, display devices of first and second configurations will be described.

[First Configuration]

In a display device of a first configuration, the IC mounting substrate is made of a tongue piece which is formed by cutting the display substrate and provided with a cut formed at the proximal end thereof to extend along the direction of extension of the side edge of the display substrate. The substrate connecting part is a remaining part of the proximal end of the tongue piece. That is, the display substrate, the IC mounting substrate and the substrate connecting part are integrally formed as a single substrate.

In the display substrate, the cut may be provided at each side of the proximal end of the tongue piece forming the IC mounting substrate.

By so doing, the substrate connecting part is connected to partway along the length of the side edge of the IC mounting substrate. Therefore, moment of force exerted on the substrate connecting part is reduced to a larger extent than that on the substrate connecting part positioned at the end of the side edge of the IC mounting substrate. Whether the moment of force is clockwise or counterclockwise, it is reduced effectively.

In the display device, the cuts at both sides of the proximal end of the tongue piece may be formed symmetrically.

If the cuts are formed symmetrically at both sides of the proximal end of the tongue piece, wiring traces are arranged in good balance from the IC mounting substrate to the substrate connecting part, i.e., a remaining part between the cuts.

In the display device, a hole may be formed at the end of the cut.

If the hole is formed at the end of the cut, stress concentrated on the end of the cut is dispersed to the periphery of the hole. This prevents the cut from getting longer in the inward direction.

The display substrate of the display device may be a plastic substrate.

Since plastic substrates have higher resistance to bending deformation than glass substrates, the plastic substrates are often applied to uses that involve the bending deformation. Therefore, if the display substrate is a plastic substrate, the effect of the present invention will be exerted more significantly, that is, the display driving IC is prevented from breaking and coming off the IC mounting substrate.

[Second Configuration]

In a display device of a second configuration, the display substrate and the substrate connecting part are separately made of materials having the same linear expansion coefficient and bonded together with a bonding agent. That is, the display substrate and the IC mounting substrate are made of separated substrates.

With the above configuration, inspection is carried out to the display driving IC which has been mounted on the IC mounting substrate. This allows detection of defect in the display driving IC at early stage. Even if defect is found in the display driving IC on the IC mounting substrate which has been mounted on the display substrate, only the IC mounting substrate and the display driving IC mounted thereon are replaced. Therefore, unlike the case where the display driving IC mounted directly on the display substrate is found defective, the display substrate which is quite expensive will not be wasted and time for replacing the display driving IC is saved. This allows improvement in productivity and cost reduction.

Further, since the display substrate and the substrate connecting part are made of materials having the same linear expansion coefficient, terminals on the display substrate and those on the substrate connecting part can be formed at the same pitch. Upon thermocompression bonding, the display substrate and the substrate connecting part show the same deformation behavior, thereby the terminals are prevented from misalignment. Therefore, unlike the case of bonding a glass substrate and a resin-made FPC as disclosed by Japanese Unexamined Patent Publication No. 2000-312070, there is no need to arrange the terminals at different pitches in consideration of deformation behaviors of the display substrate and the substrate connecting part upon thermocompression bonding to prevent misalignment of the terminals. This allows easy designing of the device.

The same linear expansion coefficient mentioned herein signifies that the difference in linear expansion coefficient of the two is 0.1% or less. The linear expansion coefficient is determined in conformity with ASTM D696 and defined as the ratio of longitudinal expansion under a degree-by-degree temperature increase. Specifically, it is a mean value among values obtained at room temperature to 250° C.

In the simplest configuration, the display substrate and the substrate connecting part of the display device are made of the same material.

In the display device, the display substrate and the substrate connecting part may be made of a plastic material.

Plastic substrates are deformed more significantly by heat than glass substrates. Therefore, in the above configuration in which the display substrate and the substrate connecting part are made of plastic, the effect of the present invention of easy designing will be particularly significant.

In the display device, the substrate connecting part may be connected to partway along the length of the side edge of the IC mounting substrate.

If the substrate connecting part is connected to partway along the length of the side edge of the IC mounting substrate, moment of force exerted on the substrate connecting part is reduced to a larger extent than that on the substrate connecting part positioned at the end of the side edge of the IC mounting substrate. Whether the moment of force is clockwise or counterclockwise, it is reduced effectively.

In the display device, the substrate connecting part may be connected to the middle of the side edge of the IC mounting substrate.

If the substrate connecting part is connected to the middle of the side edge of the IC mounting substrate, wiring traces are arranged in good balance from the IC mounting substrate to the substrate connecting part.

In the display device, the IC mounting substrate and the substrate connecting part may be formed integrally as a single substrate.

If the IC mounting substrate and the substrate connecting part are integrally formed as a single substrate, bonding the IC mounting substrate and the substrate connecting part is omitted. Therefore, as compared with the display device including separated IC mounting substrate and substrate connecting part, the configuration of the display device is simplified. Thus, a significant reduction of bonded parts leads to improvement in reliability, reduction of parts count and man-hour reduction, thereby reducing cost.

In the display device, a substrate bonding part to be bonded onto the display substrate may be formed continuously from part of the substrate connecting part closer to the display substrate and the substrate bonding part bonded to the display substrate may have a larger length than the substrate connecting part in the direction of extension of the side edge of the display substrate.

Since the substrate bonding part has a larger length than the substrate connecting part in the direction of extension of the side edge of the display substrate, terminals can be arranged thereon at a larger pitch than on the edge of the substrate connecting part. Thus, leakage between the terminals is prevented more effectively.

In the display device, the IC mounting substrate may be transparent or translucent.

If the IC mounting substrate is transparent or translucent, the mounting status of the display driving IC and the connection status with the terminals are observed easily with a microscope from the rear surface of the IC mounting substrate.

The term transparent or translucent mentioned herein signifies that the substrate has a total luminous transmittance defined by JIS K7361-1 (ISO 13468-1) of 85% or more.

In the following Embodiments 1 to 4, display devices of the first and second configurations are described in detail by taking a liquid crystal display as an example.

Embodiment 1

FIG. 1 shows a liquid crystal display panel 10 of a liquid crystal display D of the first configuration according to Embodiment 1.

The liquid crystal display panel 10 includes a horizontally oriented large rectangular first display substrate 11 and a horizontally oriented small rectangular second display substrate 12 which is bonded to the first display substrate 11 via a sealant such that the upper right corner of the second display substrate 12 is aligned with the upper right corner of the display substrate 11. The bonded substrates sandwich nematic liquid crystal or the like therebetween to form a liquid crystal layer, thereby providing a display section 13. For example, if the liquid crystal display panel 10 is a TFT liquid crystal display panel, the first display substrate 11 is a TFT substrate, while the second display substrate is a CF substrate.

Each of the first and second display substrates 11 and 12 is a plastic film made of, for example, polycarbonate resin (PC), polyethylene terephthalate resin (PET), polyarylate resin, polyether imide resin (PEI), polyether sulfone resin (PES), polyetheretherketone resin (PEEK), polyimide resin (PI), polyethylene naphthalate resin (PEN) or polyolefin resin. The plastic film used as the first and second display substrates 11 and 12 has a specific gravity of about 1.0 to 1.4 and a thickness of 0.05 to 0.50 mm, for example. The first and second display substrates 11 and 12 may also be made of glass. Or alternatively, the first and second substrates 11 and 12 may be a novel plastic substrate to be developed in the future having heat resistance, chemical resistance, low linear expansivity, and excellent smoothness and high transmittance equivalent to those of glass substrates.

Along the left side edge of the first display substrate 11, a left-side IC mounting substrate (IC mounting substrate) 14 is provided which is in the form of a longitudinally elongated rectangle. The left-side IC mounting substrate 14 is made of a narrow rectangle tongue piece which is formed by cutting the first display substrate 11. At both sides of the proximal end of the tongue piece forming the left-side IC mounting substrate 14, cuts 20 of about 0.2 mm in width are formed to extend along the direction of extension of the left side edge of the first display substrate 11 (hereinafter referred to as the left side edge direction). The cuts 20 are formed symmetrically and a remaining constricted part of the proximal end of the tongue piece functions as a left-side substrate connecting part 15 for connecting the first display substrate 11 and the left-side IC mounting substrate 14. As shown in FIG. 1, the left-side substrate connecting part 15 has length L1 smaller than length L2 of the left-side IC mounting substrate 14 in the left side edge direction.

On the left-side IC mounting substrate 14, terminals are provided for connection with the ends of a number of gate lines extending toward a display section 13. The terminals are electrically connected to leads of a narrow gate chip (display driving IC) 16 via an anisotropic conductive film (ACF), a non-conductive film (NCF) or a non-conductive paste (NCP). Thus, the gate chip 16 is mounted on the IC mounting substrate 14 by face-down bonding along the lengthwise direction of the left-side IC mounting substrate 14. For example, the gate chip 16 may be mounted on the left-side IC mounting substrate 14 by press-bonding an anisotropic conductive film onto the left-side IC mounting substrate 14 at a pressure of 0.98 MPa and a temperature of 50 to 80° C. for 3 to 5 seconds to position the gate chip 16 and then press-bonding the gate chip 16 at a pressure of 1.96 MPa and a temperature of 200° C. for 10 seconds.

Along the lower side edge of the first display substrate 11, three lower-side IC mounting substrates (IC mounting substrates) 17 are provided at certain intervals. The lower-side IC mounting substrates 17 are in the form of a laterally elongated rectangle, respectively. Each of the lower-side IC mounting substrates 17 is also made of a narrow rectangle tongue piece which is formed by cutting the first display substrate 11. At both sides of the proximal end of each tongue piece forming the lower-side IC mounting substrate 17, cuts 20 of about 0.2 mm in width are formed to extend along the direction of extension of the lower side edge of the first display substrate 11 (hereinafter referred to as the lower side edge direction). The cuts 20 are formed symmetrically and a remaining constricted part of the proximal end of the tongue piece functions as a lower-side substrate connecting part 18 for connecting the first display substrate 11 and the lower-side IC mounting substrate 17. Thus, as shown in FIG. 1, the lower-side substrate connecting part 18 has length l1 smaller than length l2 of the lower-side IC mounting substrate 14 in the lower side edge direction.

On each of the lower-side IC mounting substrates 17, terminals are provided for connection with the ends of a number of source lines extending toward a display section 13.

The terminals are electrically connected to leads of a narrow source chip (display driving IC) 19 via an anisotropic conductive film, NCF or NCP. Thus, the source chip 19 is mounted on the lower-side IC mounting substrate 17 by face-down bonding along the lengthwise direction of the lower-side IC mounting substrate 17. The source chip 19 may be mounted on the lower-side IC mounting substrate 17 in the same manner as the mounting of the gate chip 16 on the left-side IC mounting substrate 14. For example, an anisotropic conductive film is press-bonded onto the lower-side IC mounting substrate 17 at a pressure of 0.98 MPa and a temperature of 50 to 80° C. for 3 to 5 seconds to position the source chip 19 and then the source chip 19 is press-bonded at a pressure of 1.96 MPa and a temperature of 200° C. for 10 seconds.

As described above, in the liquid crystal display panel 10, the first display substrate 11, the left-side IC mounting substrate 14, the left-side substrate connecting part 15, the lower-side IC mounting substrates 17 and the lower-side substrate connecting parts 18 are integrally formed as a single substrate.

Figure 2:
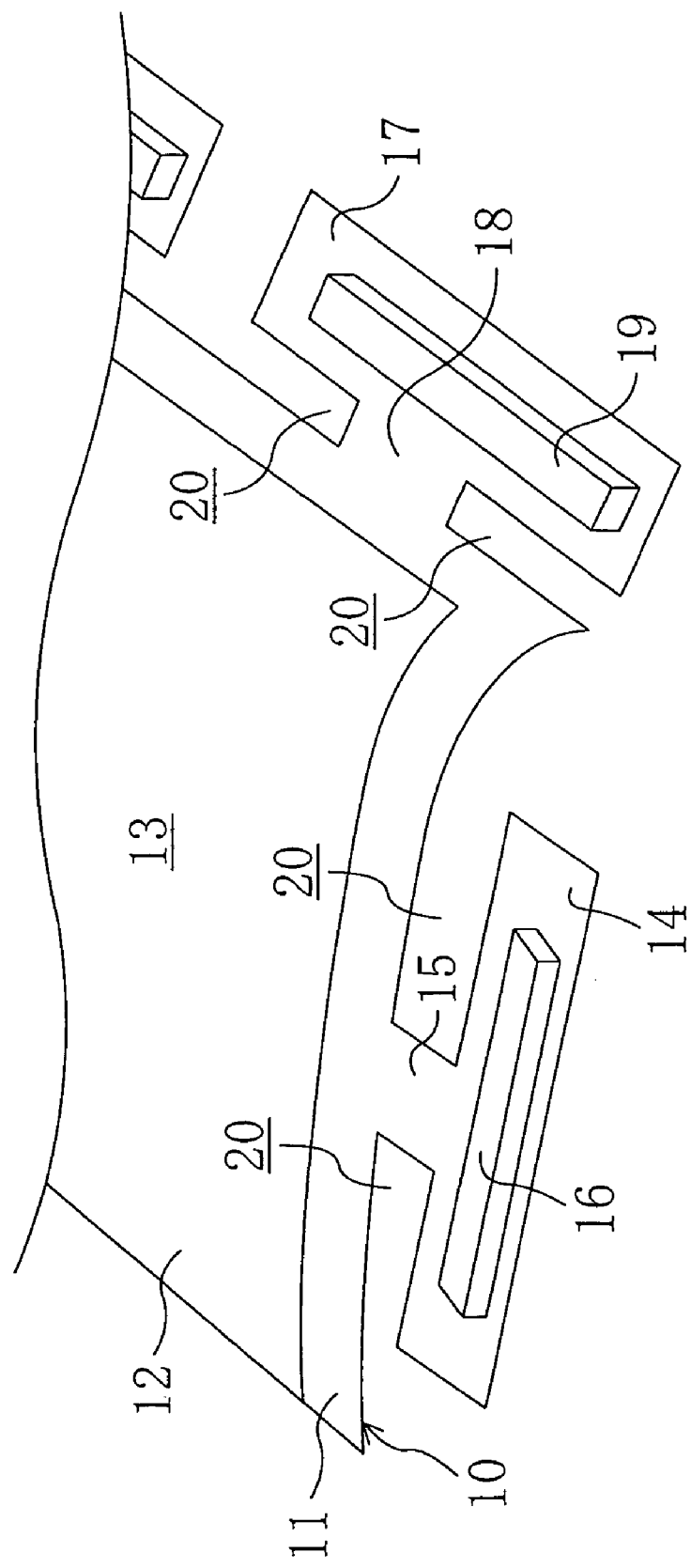
FIG. 2 is a view illustrating a liquid crystal display panel to which bending deformation is applied.

In the above configuration, the left-side IC mounting substrate 14 is arranged along the left side edge of the first display substrate 11 and connected to the first display substrate 11 via the left-side substrate connecting part 15 having the length L1 smaller than the length L2 of the left-side IC mounting substrate 14 in the left side edge direction. Thus, the left-side IC mounting substrate 14 is given with a degree of freedom independently of the first display substrate 11. Therefore, as shown in FIG. 2, even if bending deformation is given to the display substrate 11 which is a main part of the liquid crystal display panel 10, the left-side IC mounting substrate 14 is deformed less and the gate chip 16 is not greatly affected. This prevents the gate chip 16 from breaking and coming off the left-side IC mounting substrate 14.

Likewise, even if bending deformation is given to the first display substrate 11 which is a main part of the liquid crystal display panel 10, the lower-side IC mounting substrates 17 are deformed less and the source chips 19 are not greatly affected. This prevents the source chips 19 from breaking and coming off the lower-side IC mounting substrates 17.

The longer the length of the cuts 20 is, the higher degree of freedom with respect to the first display substrate 11 is given to the left-side IC mounting substrate 14 and the lower-side IC mounting substrates 17, thereby exhibiting the above-described effect more significantly. However, the left-side substrate connecting part 15 and the lower-side substrate connecting parts 18 require a certain width because a large number of wiring traces shall be arranged thereon. Depending on the number and pitch of the wiring traces, it is preferable that the cuts 20 are so formed that the length of the cuts 20 will be substantially equal to the length of the left-side substrate connecting part 15 or the lower-side substrate connecting parts 18. That is, the cuts 20 are formed from the sides of the proximal end of the tongue piece to take one-third of the length of the proximal end in the left or lower side edge direction, respectively, and the center part having the remaining one-third length serves as the left-side substrate connecting part 15 or the lower-side substrate connecting part 18.

The cuts 20 are thus formed at both sides of the proximal end of the tongue piece forming the left-side IC mounting substrate 14 or the lower-side IC mounting substrates 17. Therefore, moment of force exerted on the substrate connecting part is reduced to a larger extent than when the cut 20 is formed only at one side of the proximal end of the tongue piece to provide the substrate connecting part at the other side. Whether the moment of force is clockwise or counterclockwise, it is reduced effectively.

Further, owing to the cuts 20 formed symmetrically at both sides of the proximal end of the tongue piece forming the left-side IC mounting substrate 14 or the lower-side IC mounting substrates 17, wiring traces are arranged in good balance from the left-side IC mounting substrate 14 to the remaining part between the cuts 20, i.e., the left-side substrate connecting part 15, or from the lower-side IC mounting substrates 17 to the remaining parts between the cuts 20, i.e., the lower-side substrate connecting parts 18.

In general, plastic substrates have higher resistance to bending deformation than glass substrates, and therefore the plastic substrates are often applied to uses that involve the bending deformation. Accordingly, if the first display substrate 11 is a plastic substrate made of polycarbonate resin (PC), polyethylene terephthalate resin (PET) or polyether sulfone (PES), the effects of the present invention are exerted particularly significantly, that is, the gate chip 16 and the source chips 19 are surely prevented from breaking and coming off the left-side IC mounting substrate 14 and the lower-side IC mounting substrates 17.

Figure 3:
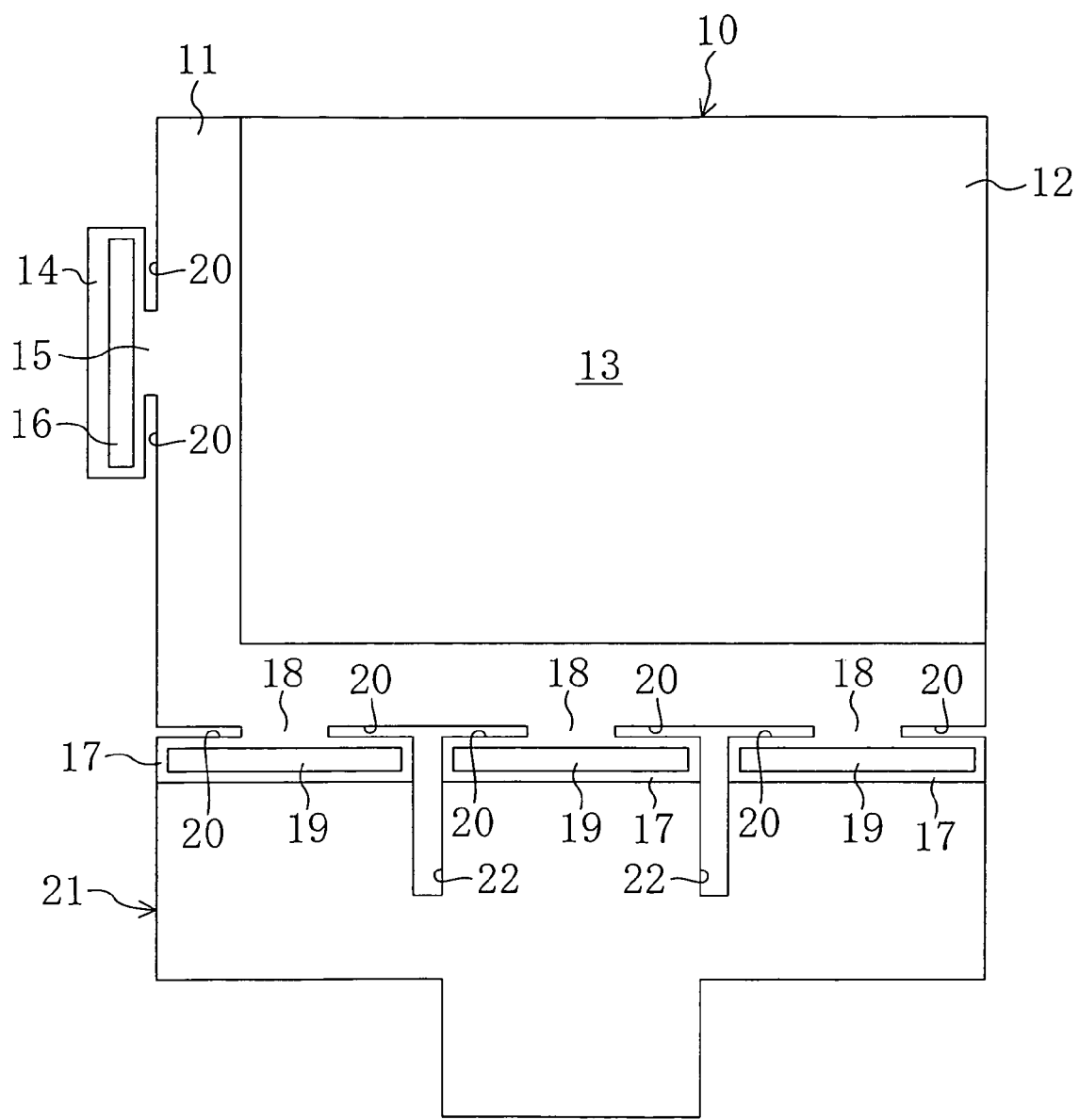
FIG. 3 is a plan view schematically illustrating the liquid crystal display panel of Embodiment 1 to which a FPC is attached.

FIG. 3 shows the liquid crystal display panel 10 to which a FPC 21 is attached.

The liquid crystal display panel 10 is provided with the FPC 21 to connect the three lower-side IC mounting substrates 17 formed along the lower side edge of the first display substrate 11. The FPC 21 includes cuts 22 of about 0.5 mm in width and 10 mm in length, for example, so that the cuts 22 separate the FPC 21 into parts connected to the lower-side IC mounting substrates 17, respectively. When connected via the FPC 21, the three lower-side IC mounting substrates 17 decrease in degree of freedom. However, due to the cuts 22 formed in the FPC 21 such that the cuts 22 separate the FPC 21 into parts connected to the lower-side IC mounting substrates 17, respectively, the lower-side IC mounting substrates 17 are separately connected to the FPC 21. Therefore, the degree of freedom of the lower-side IC mounting substrates 17 is not greatly reduced.

Figure 4:
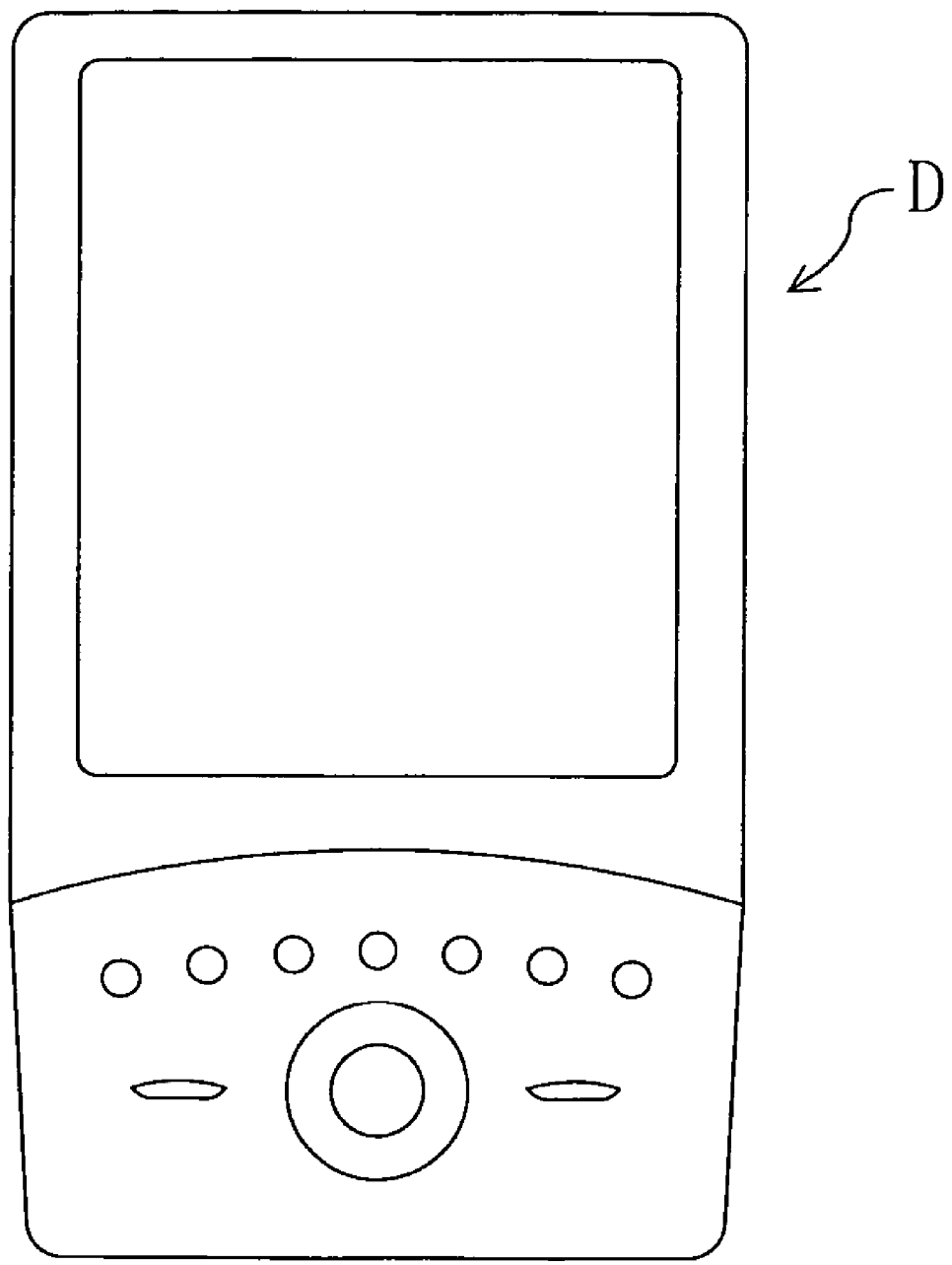
FIG. 4 is a plan view illustrating a liquid crystal display.

The liquid crystal display panel 10 and the FPC 21 as described above are installed in a liquid crystal display D as shown in FIG. 4, such as mobile electronic devices and cellular phones. In particular, the liquid crystal display panel 10 including the first and second plastic display substrates 11 and 12 is applicable to devices in which bending deformation is applied to the liquid crystal display panel such as electronic books and cylindrical liquid crystal displays, as well as devices for use on a flat surface in which bending deformation is likely to be applied to the liquid crystal display panel when external force is exerted thereon.

Embodiment 2

Figure 5:
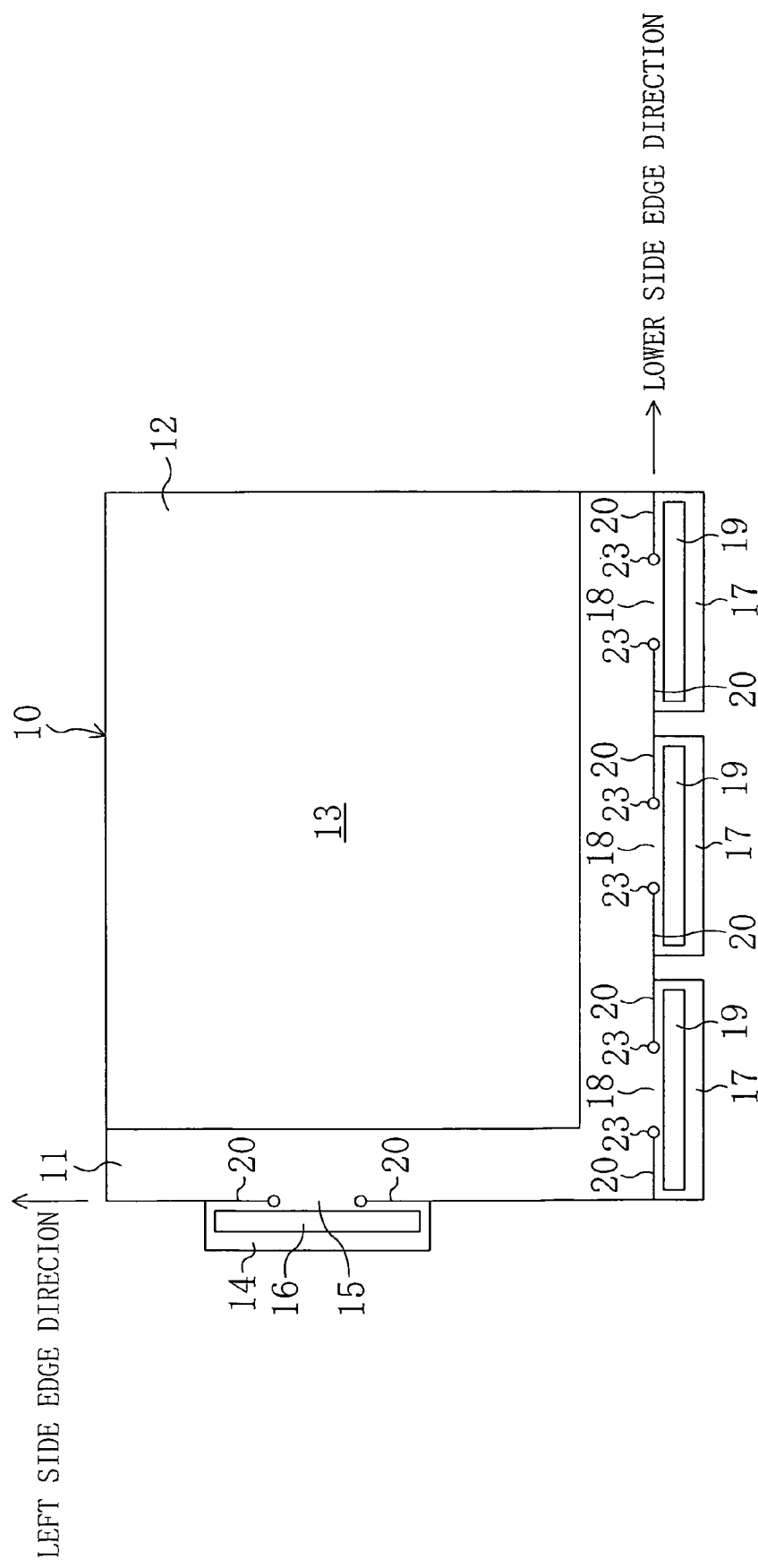
FIG. 5 is a plan view schematically illustrating a liquid crystal display panel of Embodiment 2.

FIG. 5 is a liquid crystal display panel 10 of the first configuration according to Embodiment 2. The same constituents as those of Embodiment 1 are referred by the same reference numerals.

The liquid crystal display panel 10 includes tongue pieces forming the left-side IC mounting substrate 14 and the lower-side IC mounting substrates 17. Further, cuts 20 in the form of slits of about 0.05 to 0.10 mm in width are formed at both sides of the proximal end of each tongue piece to extend along the left or lower side edge direction. Holes 23 of about 0.3 mm in diameter are formed at the ends of the cuts 20.

Except the above features, the liquid crystal display panel 10 of Embodiment 2 is configured in the same manner as that of Embodiment 1.

The liquid crystal display panel 10 may be provided with the FPC in the same manner as Embodiment 1 and installed in the liquid crystal display D for the same uses described in Embodiment 1.

Thus, since the holes 23 are provided at the ends of the cuts 20, stress concentrated on the ends of the slits 20 is dispersed to the periphery of the holes 23. This prevents the cuts 20 from getting longer in the inward direction.

Except the above effect, the liquid crystal display panel 10 of Embodiment 2 offers the same effects as that of Embodiment 1.

Also in this embodiment, the longer the length of the cuts 20 is, or the smaller the distance between opposite holes 23 is, the higher degree of freedom with respect to the first display substrate 11 is given to both of the left-side IC mounting substrate 14 and the lower-side IC mounting substrates 17. Thus, the above-described effects are exerted particularly significantly, that is, the gate chip 16 and the source chips 19 are surely prevented from breaking and coming off the left-side IC mounting substrate 14 and the lower-side IC mounting substrates 17. However, the left-side substrate connecting part 15 and the lower-side substrate connecting parts 18 require a certain width because a large number of wiring traces shall be arranged thereon. Depending on the number and pitch of the wiring traces, the cuts 20 are so formed that the length of the cuts 20 will be substantially equal to the lengths of the left-side substrate connecting part 15 and the lower-side substrate connecting parts 18. That is, the cuts 20 are formed from the sides of the proximal end of the tongue piece to take one-third of the length of the proximal end in the left or lower side edge direction, respectively, and the center part having the remaining one-third length serves as the left-side substrate connecting part 15 or the lower-side substrate connecting part 18.

Embodiment 3

Figure 6:
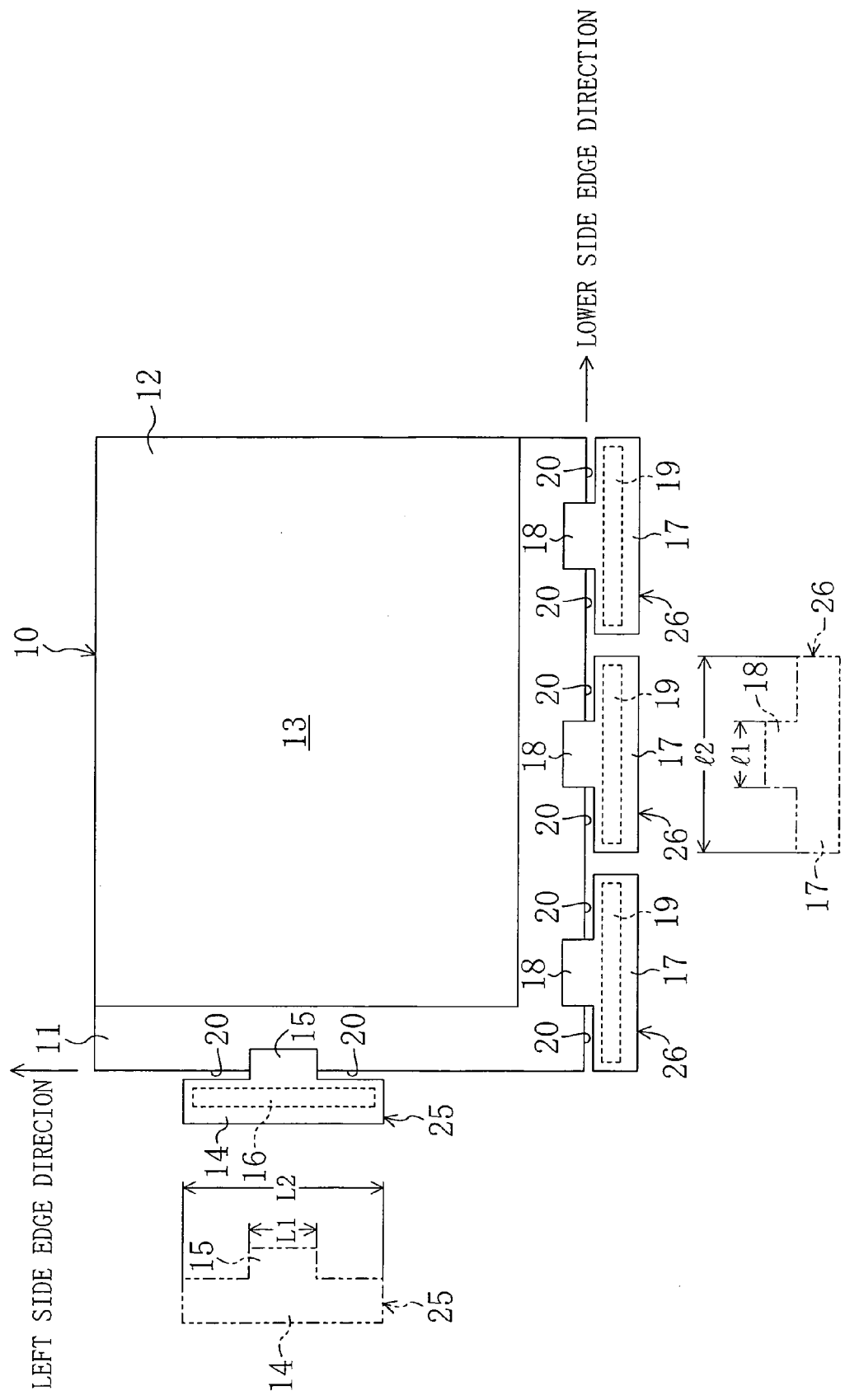
FIG. 6 is a plan view schematically illustrating a liquid crystal display panel of Embodiment 3.

FIG. 6 shows a liquid crystal display panel 10 of the second configuration according to Embodiment 3. The same constituents as those of Embodiment 1 are referred by the same reference numerals.

The liquid crystal display panel 10 includes a horizontally oriented large rectangular first display substrate 11 and a horizontally oriented small rectangular second display substrate 12 which is bonded to the first display substrate 11 via a sealant such that the upper right corner of the second display substrate 12 is aligned with the upper right corner of the display substrate 11. Nematic liquid crystal or the like is injected between the bonded substrates to form a liquid crystal layer, thereby providing a display section 13. For example, if the liquid crystal display panel 10 is a TFT liquid crystal display panel, the first display substrate 11 is a TFT substrate, while the second display substrate is a CF substrate.

Each of the first and second display substrates 11 and 12 is a plastic film made of, for example, polycarbonate resin (PC), polyethylene terephthalate resin (PET), polyarylate resin, polyether imide resin (PEI), polyether sulfone resin (PES), polyetheretherketone resin (PEEK), polyimide resin (PI), polyethylene naphthalate resin (PEN) or polyolefin resin. The plastic film used as the first and second display substrates 11 and 12 has a specific gravity of about 1.0 to 1.4 and a thickness of 0.05 to 0.50 mm, for example. The first and second display substrates 11 and 12 may also be made of glass.

Along the left side edge of the first display substrate 11, a left-side IC mounting substrate (IC mounting substrate) 14 is provided which is in the form of a longitudinally elongated rectangle. The left-side IC mounting substrate 14 includes a left-side substrate connecting part 15 protruding from the middle of the side edge of the left-side IC mounting substrate 14 toward the first display substrate 11. That is, the left-side IC mounting substrate 14 and the left-side substrate connecting part 15 are integrated to form a single T-shaped substrate, i.e., a gate chip mounting substrate 25. The edge of the left-side substrate connecting part 15 protruding from the left-side IC mounting substrate 14 is bonded to the first display substrate 11, thereby bonding the gate chip mounting substrate 25 to the first display substrate 11. As shown in FIG. 6, the left-side substrate connecting part 15 has length L1 smaller than length L2 of the left-side IC mounting substrate 14 in the direction of extension of the left side edge of the display substrate 11 (hereinafter may be referred to as the left side edge direction).

The gate chip mounting substrate 25 constituted of the left-side IC mounting substrate 14 and the left-side substrate connecting part 15 is made of a plastic film or glass similar to that used for the first display substrate 11. The material for the gate chip mounting substrate 25 has the same linear expansion coefficient as the material for the first display substrate 11. In the simplest configuration, the gate chip mounting substrate 25 and the first display substrate 11 are made of the same material. For example, polycarbonate resin (PC) has a linear expansion coefficient of $68 \times 10^{-6}/°$ C., polyethylene terephthalate resin (PET) has $65 \times 10^{-6}/°$ C., polyether imide resin (PEI) has $47\text{-}56 \times 10^{-6}/°$ C., polyether sulfone resin (PES) has $55 \times 10^{-6}/°$ C., polyetheretherketone resin (PEEK) has $40\text{-}47 \times 10^{-6}/°$ C. (<150° C.) and polyimide resin (PI) has $45\text{-}56 \times 10^{6}/°$ C. In this context, the same linear expansion coefficient signifies that the difference in linear expansion coefficient between the substrates 25 and 11 is 0.1% or less. The linear expansion coefficient is determined in conformity with ASTM D696 and defined as the ratio of longitudinal expansion under a degree-by-degree temperature increase. Specifically, it is a mean value among values obtained at room temperature to 250° C. The gate chip mounting substrate 25 is preferably transparent or translucent. The term transparent or translucent signifies that the substrate has a total luminous transmittance defined by JIS K7361-1 (ISO 13468-1) of 85% or more.

On the rear surface of the left-side IC mounting substrate 14, terminals are provided for connection with the ends of a number of wiring traces extending towards the edge of the left-side substrate connecting part 15. The terminals are electrically connected to leads of a narrow gate chip (display driving IC) 16 via an anisotropic conductive film, NCF or NCP. Thus, the gate chip 16 is mounted on the left-side IC mounting substrate 14 by face-down bonding along the lengthwise direction of the left-side IC mounting substrate 14. The gate chip 16 may be mounted on the left-side IC mounting substrate 14 by press-bonding an anisotropic conductive film onto the left-side IC mounting substrate 14 at a pressure of 0.98 MPa and a temperature of 50 to 80° C. for 3 to 5 seconds to position the gate chip 16 and then press-bonding the gate chip 16 at a pressure of 1.96 MPa and a temperature of 200° C. for 10 seconds. At the edge of the left-side substrate connecting part 15, terminals are formed at a certain pitch for connection with the other ends of the wiring traces.

Figure 7:
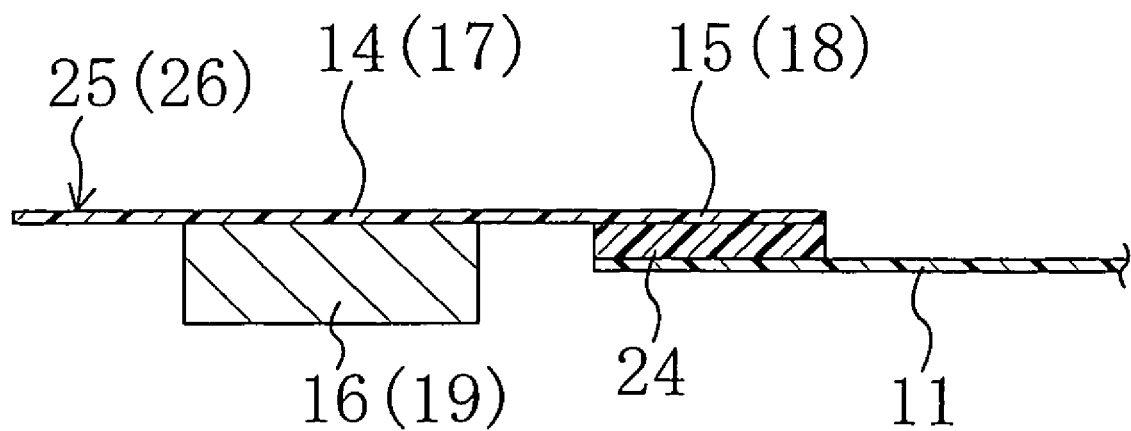
FIG. 7 is a sectional view illustrating how to bond a first display substrate and a left-side substrate connecting part.

On part of the front surface of the first display substrate 11 corresponding to the gate chip mounting substrate 25, terminals are arranged at the same pitch as the terminals formed on the edge of the left-side substrate connecting part 15 for connection with the ends of a number of gate lines extending towards the display section 13. As shown in FIG. 7, the rear surface of the gate chip mounting substrate 25 and the front surface of the first display substrate 11 are bonded via a bonding agent such as an anisotropic conductive film, NCF or NCP to establish electrical connection between the terminals. The gate chip mounting substrate 25 and the first display substrate 11 may be bonded, for example, by press-bonding an anisotropic conductive film to one of the substrates 25 and 11 at a pressure of 0.98 MPa and a temperature of 50 to 80° C. for 3 to 5 seconds, and then press-bonding the other substrate thereon at a pressure of 1.96 MPa and a temperature of 200° C. for 10 seconds.

Along the lower side edge of the first display substrate 11, three lower-side IC mounting substrates (IC mounting substrates) 17 are provided at certain intervals. The lower-side IC mounting substrates 17 are in the form of a laterally elongated rectangle, respectively. Each of the lower-side IC mounting substrates 17 includes a lower-side substrate connecting part 18 protruding from the middle of the side edge of the lower-side IC mounting substrate 17 toward the first display substrate 11. That is, the lower-side IC mounting substrates 17 and the lower-side substrate connecting parts 18 are integrated to form T-shaped substrates, respectively, i.e., source chip mounting substrates 26. Each of the source chip mounting substrates 26 is bonded to the first display substrate 11 at the edge of the lower-side substrate connecting part 18 protruding from the lower-side IC mounting substrate 17. As shown in FIG. 6, the lower-side substrate connecting part 18 has length l1 smaller than length l2 of the lower-side IC mounting substrate 17 in the direction of extension of the lower side edge of the first display substrate 11 (hereinafter may be referred to as lower side edge direction).

The source chip mounting substrate 26 constituted of the lower-side IC mounting substrate 17 and the lower-side substrate connecting part 18 is made of a plastic film or glass similar to that used as the first display substrate 11. The material for the source chip mounting substrate 26 has the same linear expansion coefficient as the material for the first display substrate 11. In the simplest configuration, the source chip mounting substrate 26 and the first display substrate 11 are made of the same material. The source chip mounting substrate 26 is preferably transparent or translucent.

On the rear surface of each of the lower-side IC mounting substrates 17, terminals are provided to be connected with the ends of a number of wiring traces extending towards the edge of the lower-side substrate connecting part 18. The terminals are electrically connected to leads of a narrow source chip (display driving IC) 19 via an anisotropic conductive film, NCF or NCP. Thus, the source chip 19 is mounted on the lower-side IC mounting substrate 17 by face-down bonding along the lengthwise direction of the lower-side IC mounting substrate 17. The source chip 19 may be mounted on the lower-side IC mounting substrate 17 in the same manner as the mounting of the gate chip 16 on the left-side IC mounting substrate 14. For example, an anisotropic conductive film is press-bonded onto the lower-side IC mounting substrate 17 at a pressure of 0.98 MPa and a temperature of 50 to 80° C. for 3 to 5 seconds to position the source chip 19 and then the source chip 19 is press-bonded at a pressure of 1.96 MPa and a temperature of 200° C. for 10 seconds. At the edge of each of the lower-side substrate connecting parts 18, terminals are formed at a certain pitch for connection with the other ends of the wiring traces.

On part of the front surface of the first display substrate 11 corresponding to the source chip mounting substrates 26, terminals are formed at the same pitch as those on the edge of the lower-side substrate connecting parts 18 for connection with the ends of a number of source lines extending toward the display section 13. As shown in FIG. 7, the rear surfaces of the source chip mounting substrates 26 are bonded to the front surface of the first display substrate 11 with a bonding agent 24 such as an anisotropic conductive film, NCF or NCP to establish electrical connection between the terminals. The source chip mounting substrates 26 and the first display substrate 11 are bonded in the same manner as the bonding of the gate chip mounting substrate 25 and the first display substrate 11. For example, an anisotropic conductive film is press-bonded to one of the substrates 26 and 11 at a pressure of 0.98 MPa and a temperature of 50 to 80° C. for 3 to 5 seconds, and then the other substrate is press bonded at a pressure of 1.96 MPa and a temperature of 200° C. for 10 seconds.

As described above, in the liquid crystal display panel 10 of Embodiment 3, the left-side IC mounting substrate 14 and the left-side substrate connecting part 15 are formed as a separated substrate from the first display substrate 11 and the lower-side IC mounting substrates 17 and the lower-side substrate connecting parts 18 are formed as separated substrates from the first display substrate 11.

With the above configuration, the left-side IC mounting substrate 14 is arranged along the left side edge of the first display substrate 11 and connected to the first display substrate 11 via the left-side substrate connecting part 15 having the length L1 smaller than the length L2 of the left-side IC mounting substrate 14 in the left side edge direction. Accordingly, the left-side IC mounting substrate 14 has a degree of freedom independently of the first display substrate 11. Therefore, even if bending deformation is given to the display substrate 11 which is a main part of the liquid crystal display panel 10, the left-side IC mounting substrate 14 is deformed less and the gate chip 16 is not greatly affected. This prevents the gate chip 16 from breaking and coming off the left-side IC mounting substrate 14.

Likewise, even if bending deformation is given to the first display substrate 11 which is a main part of the liquid crystal display panel 10, the lower-side IC mounting substrates 17 are deformed less and the source chips 19 are not greatly affected. This prevents the source chips 19 from breaking and coming off the lower-side IC mounting substrates 17.

The smaller length in the left and lower side edge directions the left-side and lower-side substrate connecting parts 15 and 18 have, or the smaller width they have, the higher degree of freedom with respect to the first display substrate 11 is given to the left-side and lower-side IC mounting substrates 14 and 17. Therefore, the above-described effects are exhibited more significantly. However, the left-side substrate connecting part 15 and the lower-side substrate connecting parts 18 require a certain width because a large number of wiring traces shall be arranged thereon. Depending on the number and pitch of the wiring traces, it is preferable that the left-side or lower-side substrate connecting parts 15 and 18 protrude from the middle of the side edge the left-side and lower-side IC mounting substrates 14 and 17, respectively, and the left-side and lower-side substrate connecting parts 15 and 18 take a one third length of the side edges of the left-side and lower-side IC mounting substrate 14 or 17, respectively.

When display driving ICs such as gate chips and source chips are mounted directly on a display substrate, inspection of the display driving ICs is carried out after they have been mounted on the display substrate. Then, if the display driving ICs are found defective, they must be replaced. However, since the display driving ICs are mounted on the display substrate using a thermosetting resin, it is difficult to remove them even with use of a remover exclusive for this purpose. In some cases, the display substrate itself must be discarded. According to the above-mentioned configuration, however, the first display substrate 11 and the gate chip mounting substrate 25 are made of separate substrates. Accordingly, the inspection is carried out to the gate chip 16 mounted on the gate chip mounting substrate 25. This allows detection of defect in the gate chip 16 at early stage. Even if defect is found in the gate chip 16 on the gate chip mounting substrate 25 which has been mounted on the first display substrate 11, only the gate chip mounting substrate 25 and the gate chip 16 mounted thereon are replaced. Likewise, the source chip mounting substrate 26 is also separated from the first display substrate 11, inspection is carried out to the source chip 19 mounted on the source chip mounting substrate 26. This allows detection of defect in the source chip 19 at early stage. Even if defect is found in the source chip 19 on the source chip mounting substrate 26 which has been mounted on the first display substrate 11, only the source chip mounting substrate 26 and the source chip 19 mounted thereon are replaced. Therefore, unlike the case where the display driving ICs mounted directly on the display substrate are found defective, the display substrate such as an expensive TFT substrate will not be wasted and time for replacing the display driving ICs is saved. This allows improvement in productivity and cost reduction.

As disclosed by Japanese Unexamined Patent Publication No. 2000-312070, a glass substrate and a resin-made FPC are greatly different in linear expansion coefficient. Therefore, terminals formed on the glass substrate and those on the FPC are arranged in different pitches in consideration of their deformation behaviors upon thermocompression bonding them, thereby preventing misalignment between the terminals on the bonded substrates. However, according to the above-described configuration, materials for the first display substrate 11 and the gate chip mounting substrate 25 or the source chip mounting substrate 26 have the same linear expansion coefficient. Therefore, even if terminals on both the substrates are arranged at the same pitch, they will not be misaligned because the substrates show the same deformation behavior. Thus, there is no need of arranging the terminals in different pitches so as to prevent the misalignment between the terminals after the bonding. This allows easy designing of the device.

The left-side substrate connecting part 15 and the lower-side substrate connecting part 18 protrude from the middle of the side edge of the left-side IC mounting substrate 14 and the lower-side IC mounting substrate 17, respectively. Therefore, moment of force exerted on the left-side and lower-side substrate connecting parts 15 and 18 is reduced to a larger extent as compared with the case where the left-side and lower-side substrate connecting parts 15 and 18 are formed at the end of the side edge of the left-side and lower-side IC mounting substrates 14 and 17, respectively. Whether the moment of force is clockwise or counterclockwise, it is reduced effectively. Further, since the left-side substrate connecting part 15 protrudes from the middle of the side edge of the left-side IC mounting substrate 14, wiring traces extending from the left-side IC mounting substrate 14 to the left-side substrate connecting part 15 are arranged in good balance. Likewise, wiring traces extending from the lower-side IC mounting substrate 17 to the lower-side substrate connecting part 18 are also arranged in good balance.

The left-side IC mounting substrate 14 and the left-side substrate connecting part 15 are integrated as a single substrate and the lower-side IC mounting substrate 17 and the lower-side substrate connecting part 18 are integrated as a single substrate. Therefore, as compared with the case where the IC mounting substrates 14 and 17 are separated from the substrate connecting parts 15 and 18, respectively, bonding the left-side IC mounting substrate 14 to the left-side substrate connecting part 15 and bonding the lower-side IC mounting substrate 17 to the lower-side substrate connecting part 18 are omitted. This simplifies the configuration of the display device. Such a significant reduction of bonded part leads to improvement in reliability, reduction of parts count and man-hour reduction, thereby reducing cost.

In general, plastic substrates have higher resistance to bending deformation than glass substrates and the plastic substrates are often applied to uses that involve the bending deformation. Accordingly, if the first display substrate 11, the gate chip mounting substrate 25 and the source chip mounting substrate 26 are plastic substrates made of polycarbonate resin (PC), polyethylene terephthalate resin (PET) or polyether sulfone (PES), the effects of the present invention are exerted particularly significantly, that is, the gate chip 16 and the source chips 19 are surely prevented from breaking and coming off the left-side IC mounting substrate 14 and the lower-side IC mounting substrates 17. Even with use of the plastic substrates which are more deformed by heat than the glass substrates, the effect of the present invention of easy designing is exerted particularly remarkably.

If display driving ICs such as the gate chip 16 and the source chip 19 are mounted on an opaque FPC, inspection of the mounting status needs to be carried out by a burn-in test or with X rays. However, if the gate chip mounting substrate 25 and the source chip mounting substrate 26 are transparent or translucent, the mounting status of the gate chip 16 and the source chip 19 as well as the connection status with the terminals are observed easily with a microscope from the rear surface of the gate chip mounting substrate 25 and the source chip mounting substrate 26.

Figure 8:
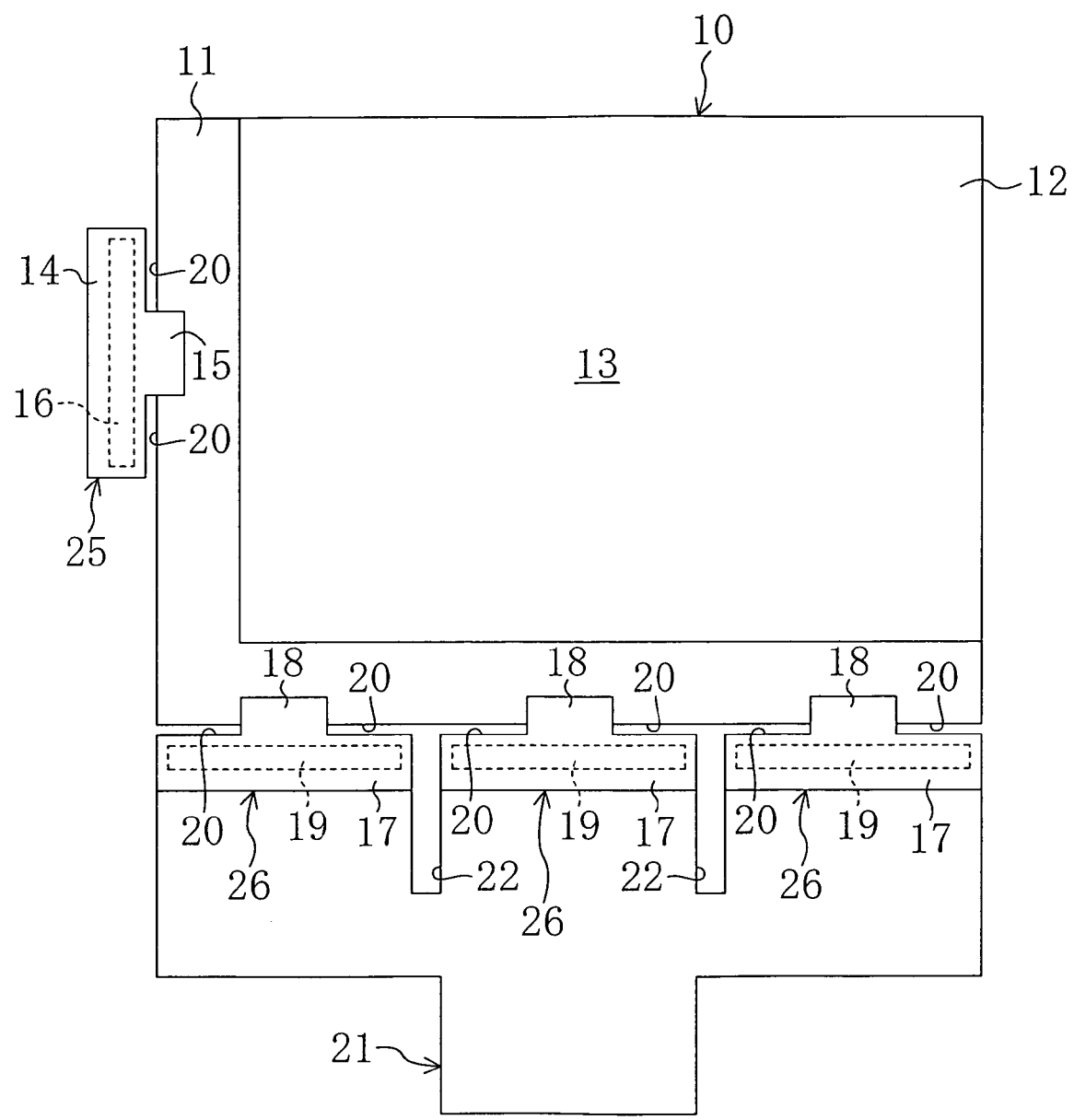
FIG. 8 is a plan view schematically illustrating the liquid crystal display panel of Embodiment 3 to which a FPC is attached.

FIG. 8 shows a liquid crystal display panel 10 to which an FPC 21 is attached.

The liquid crystal display panel 10 is provided with the FPC 21 to connect the three lower-side IC mounting substrates 17 formed along the lower side edge of the first display substrate 11. The FPC 21 includes cuts 22 of about 0.5 mm in width and 10 mm in length, for example, so that the cuts 22 separate the FPC 21 into parts connected to the lower-side IC mounting substrates 17, respectively. When connected via the FPC 21, the three lower-side IC mounting substrates 17 decrease in degree of freedom. However, due to the cuts 22 formed in the FPC 21, the lower-side IC mounting substrates 17 are separately connected to the FPC 21. Therefore, the degree of freedom of the lower-side IC mounting substrates 17 is not greatly reduced.

The liquid crystal display panel 10 and the FPC 21 as described above are installed in a liquid crystal display D as shown in FIG. 4, such as mobile electronic devices and cellular phones. In particular, the liquid crystal display panel 10 including the first and second plastic display substrates 11 and 12 is applicable to devices in which bending deformation is applied to the liquid crystal display panel such as electronic books and cylindrical liquid crystal displays, as well as devices for use on a flat surface in which bending deformation is likely to be applied to the liquid crystal display panel when external force is exerted thereon.

Embodiment 4

Figure 9:
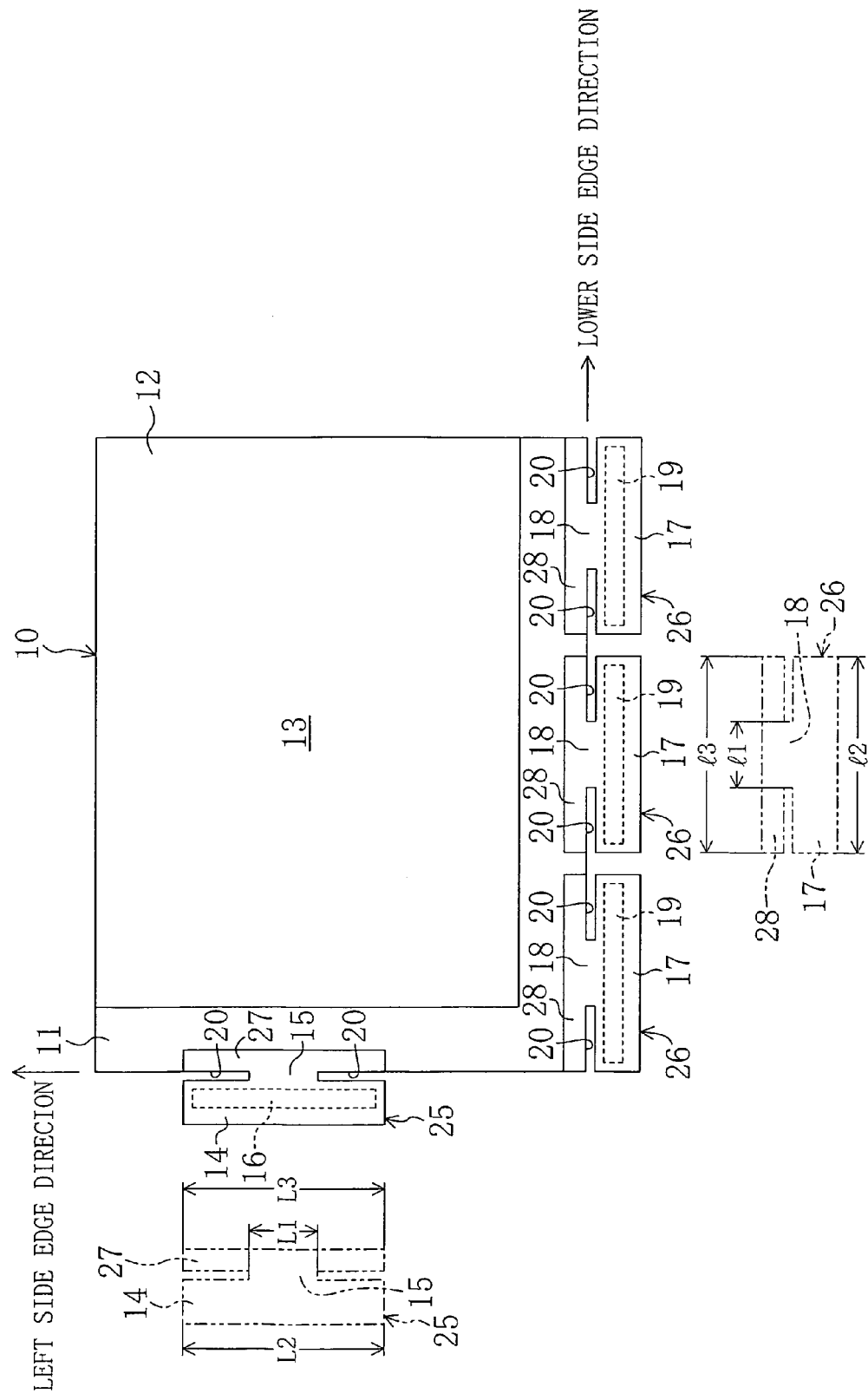
FIG. 9 is a plan view schematically illustrating a liquid crystal display panel of Embodiment 4.

FIG. 9 is a liquid crystal display panel 10 of the second configuration according to Embodiment 4 for a liquid crystal display D. The same constituents as those in Embodiment 1 are referred by the same reference numerals.

In the liquid crystal display panel 10, a left-side substrate connecting part 15 protrudes from the middle of the side edge of a left-side IC mounting substrate 14 toward the first display substrate 11. Further, a left-side substrate bonding part 27 in the form of a longitudinally elongated rectangle is formed continuously from part of the left-side substrate connecting part 15 closer to the first display substrate 11. That is, the left-side IC mounting substrate 14, the left-side substrate connecting part 15 and the left-side substrate bonding part 27 are integrated to form a single H-shaped substrate, i.e., a gate chip mounting substrate 25. The left-side substrate bonding part 27 continuously extending from the constricted left-side substrate connecting part 15 overlaps the first display substrate 11 to be bonded thereto, thereby mounting the gate chip mounting substrate 25 on the first display substrate 11. On the left-side substrate bonding part 27, terminals are arranged at a certain pitch to correspond with a large number of wiring traces drawn from the left-side IC mounting substrate 14. As shown in FIG. 9, the left-side substrate connecting part 15 connected to the first display substrate 11 has length L1 smaller than length L2 of the left-side IC mounting substrate 14 in the direction of extension of the left side edge of the first display substrate 11 (hereinafter may be referred to as the left side edge direction). Further, the left-side substrate bonding part 27 has length L3 larger than the length L1 of the left-side substrate connecting part 15 in the left side edge direction. The length L2 of the left-side IC mounting substrate and the length L3 of the left-side substrate bonding part 27 in the left side edge direction are substantially the same.

Likewise, lower-side substrate connecting parts 18 protrude from the middle of the side edges of lower-side IC mounting substrates 17, respectively, toward the first display substrate 11. Further, a lower-side substrate bonding part 28 in the form of a laterally elongated rectangle is formed continuously from part of each of the lower-side substrate connecting parts 18 closer to the first display substrate 11. That is, the lower-side IC mounting substrate 17, the lower-side substrate connecting part 18 and the lower-side substrate bonding part 28 are integrated as a single H-shaped substrate, i.e., a source chip mounting substrate 26. The lower-side substrate bonding part 28 continuously extending from the constricted lower-side substrate connecting part 18 overlaps the first display substrate 11 to be bonded thereto, thereby mounting the source chip mounting substrate 26 on the first display substrate 11. On the lower-side substrate bonding part 28, terminals are arranged in a certain pitch to correspond with a large number of wiring traces drawn from the source chip mounting substrate 26. As shown in FIG. 9, the lower-side substrate bonding part 18 connected to the first display substrate 11 has length l1 smaller than length l2 of the lower-side IC mounting substrate 14 in the direction of extension of the lower side edge of the display substrate 11 (hereinafter may be referred to as the lower side edge direction). Further, the lower-side substrate bonding part 28 has length l3 larger than the length l1 of the lower-side substrate connecting part 18 in the lower side edge direction. The length l2 of the lower-side IC mounting substrate 17 and the length l3 of the lower-side substrate bonding part 27 in the lower side edge direction are substantially the same.

Except the above, the liquid crystal display panel 10 of Embodiment 4 is the same as that of Embodiment 3.

The liquid crystal display panel 10 may be provided with an FPC in the same manner as Embodiment 3 and installed in the liquid crystal display D for the same uses described in Embodiment 3.

With the above configuration, the length L3 of the left-side substrate bonding part 27 is larger than the length L1 of the left-side substrate connecting part 15 in the left side edge direction. Therefore, terminals are arranged in a larger pitch on the left-side substrate bonding part 27 than on the left-side substrate connecting part 15. Likewise, since the length l3 of the lower-side substrate bonding part 28 is larger than the length l1 of the lower-side substrate connecting part 18 in the lower side edge direction, terminals are arranged in a larger pitch on the lower-side substrate bonding part 28 than on the lower-side substrate connecting part 18. Thus, as compared with the case where the terminals are arranged at the ends of the left-side substrate connecting part 15 and the lower-side substrate connecting part 18, leakage between the terminals is prevented to a greater extent.

Except the above, the effect of the liquid crystal display panel 10 of Embodiment 4 is the same as that of Embodiment 3.

Other Embodiments

Figure 10:
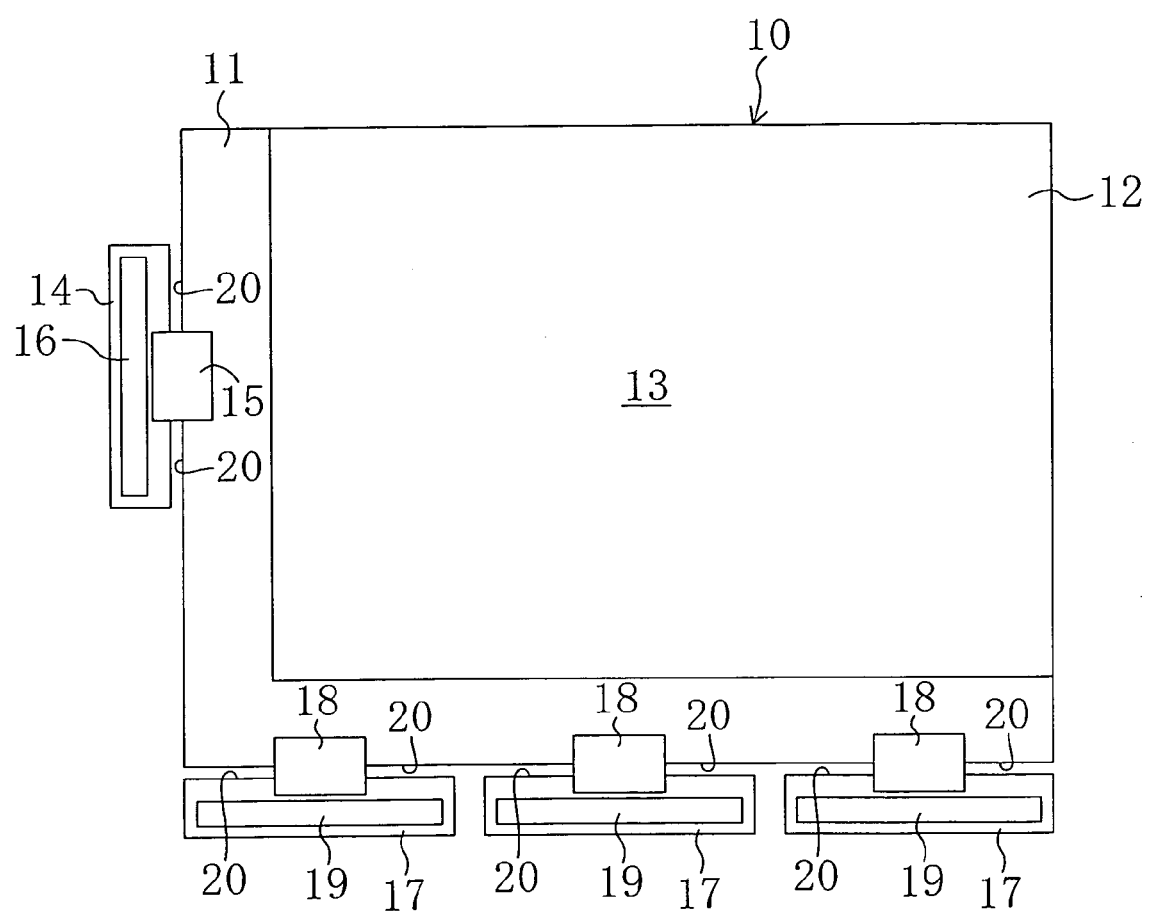
FIG. 10 is a plan view schematically illustrating a liquid crystal display panel of another embodiment.

In Embodiments 1 and 2 directed to the first configuration, the first display substrate 11, left-side IC mounting substrate 14, left-side substrate connecting part 15, lower-side IC mounting substrates 17 and lower-side substrate connecting parts 18 are integrated into a single substrate. On the other hand, in Embodiments 3 and 4 directed to the second configuration, the gate chip mounting substrate 25 including the left-side IC mounting substrate 14 and the left-side substrate connecting part 15 and the source chip mounting substrates 26 including the lower-side IC mounting substrates 17 and the lower-side substrate connecting parts 18 are separated from the first display substrate 11. However, the present invention is not particularly limited thereto. As shown in FIG. 10, the first display substrate 11, the left-side IC mounting substrate 14, the left-side substrate connecting part 15, the lower-side IC mounting substrates 17 and the lower-side substrate connecting parts 18 may be separated from each other.

In Embodiments 1 and 2 described above, the tongue piece forming the left-side IC mounting substrate 14 or the lower-side IC mounting substrate 17 is provided with the cuts 20 at both sides of the proximal end thereof. However, the present invention is not particularly limited thereto and the cut may be formed at one side of the proximal end of the tongue piece.

In Embodiments 1 and 2 described above, the tongue piece forming the left-side IC mounting substrate or the lower-side IC mounting substrate 17 is provided with the cuts 20 symmetrically formed at both sides of the proximal end thereof. However, the present invention is not particularly limited thereto and the cuts 20 may be asymmetric.

In Embodiments 3 and 4 described above, the left-side substrate connecting part 15 or the lower-side substrate connecting part 18 protrudes from the middle of the side edge of the left-side IC mounting substrate 14 or the lower-side IC mounting substrate 17. However, the present invention is not particularly limited thereto and the substrate connecting part 15 or 18 may protrude from partway along the length of the side edge of the IC mounting substrate 14 or 17 or the end of the length of the side edge of the IC mounting substrate 14 or 17.

Figure 11:
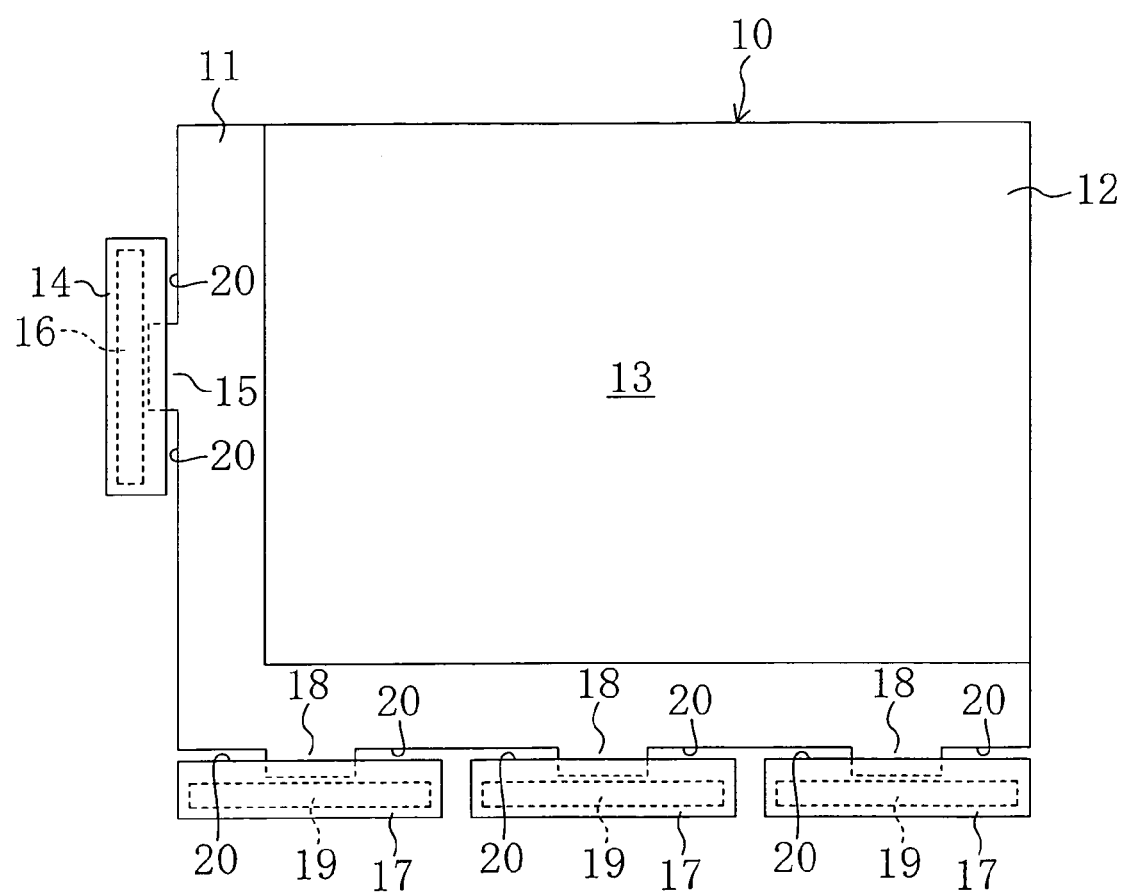
FIG. 11 is a plan view schematically illustrating a liquid crystal display panel of still another embodiment.

In Embodiments 3 and 4 described above, the gate chip mounting substrate 25 including the left-side IC mounting substrate 14 and the left-side substrate connecting part 15 is separated from the first display substrate 11 and the source chip mounting substrates 26 including the lower-side IC mounting substrates 17 and the lower-side substrate connecting parts 18, respectively, are separated from the first display substrate 11. However, the present invention is not particularly limited thereto. As shown in FIG. 11, the left-side substrate connecting part 15 may be integrated with the first display substrate 11 such that it protrudes leftward from the left side edge of the first display substrate 11, while the left-side IC mounting substrate 14 is separated from the first display substrate 11 and the left-side connector 15. Likewise, the lower-side substrate connecting parts 18 may be integrated with the first display substrate 11 such that they protrude downward from the lower side edge of the first display substrate 11, while the lower-side IC mounting substrates 17 are separated from the first display substrate 11 and the lower-side substrate connecting parts 18.

It would be obvious to those skilled in the art the foregoing description is a preferred embodiment of the disclosed device and that various changes and modifications may be made in the invention without departing from the spirit and scope of the invention.

What is claimed is:

1. A display device comprising a display panel including:
   a display substrate;
   an IC mounting substrate which is arranged along the side edge of the display substrate and provided with a display driving IC mounted thereon by face-down bonding; and
   a substrate connecting part which connects the display substrate and the IC mounting substrate, wherein
   the substrate connecting part connected to the display substrate has a smaller length than the IC mounting substrate in the direction of extension of the side edge of the display substrate, and wherein a plurality of IC mounting substrates are formed along the side edge of the display substrate;

wherein a FPC is arranged to connect the plurality of IC mounting substrates formed along the side edge of the display substrate and wherein the FPC is provided with cuts so that the cuts separate the FPC into parts connected to the IC mounting substrates, respectively.

2. A display device according to claim 1, wherein the IC mounting substrate is made of a tongue piece which is formed by cutting the display substrate and provided with a cut formed at the proximal end thereof to extend along the side edge of the display substrate and the substrate connecting part is a remaining part of the proximal end of the tongue piece.

3. A display device according to claim 2, wherein the cut is formed at each side of the proximal end of the tongue piece forming the IC mounting substrate.

4. A display device according to claim 3, wherein the cuts at both sides of the proximal end of the tongue piece are formed symmetrically.

5. A display device according to claim 2, wherein a hole is formed at the end of the cut.

6. A display device according to claim 2, wherein the display substrate is a plastic substrate.

7. A display device according to claim 1, wherein the display substrate and the substrate connecting part are separately made of materials having the same linear expansion coefficient and bonded together with a bonding agent.

8. A display device according to claim 7, wherein the display substrate and the substrate connecting part are made of the same material.

9. A display device according to claim 7, wherein the display substrate and the substrate connecting part are made of plastic.

10. A display device according to claim 7, wherein the substrate connecting part is connected to the IC mounting substrate partway along the length of the side edge of the IC mounting substrate.

11. A display device according to claim 10, wherein the substrate connecting part is connected to the middle of the side edge of the IC mounting substrate.

12. A display device according to claim 7, wherein the IC mounting substrate and the substrate connecting part are integrally formed as a single substrate.

13. A display device according to claim 7, wherein a substrate bonding part to be bonded onto the display substrate is formed continuously from part of the substrate connecting part closer to the display substrate and the substrate bonding part bonded to the display substrate has a larger length than the substrate connecting part in the direction of extension of the side edge of the display substrate.

14. A display device according to claim 7, wherein the IC mounting substrate is transparent or translucent.

15. A display device according to claim 1, wherein the display panel is a liquid crystal display panel.

* * * * *